United States Patent [19]

O'Farrell

[11] Patent Number: 4,922,261

[45] Date of Patent: May 1, 1990

[54] AERIAL SYSTEMS

[75] Inventor: Kevin O'Farrell, Cambridge, United Kingdom

[73] Assignee: Cotag International Ltd., Cambridge, United Kingdom

[21] Appl. No.: 121,970

[22] PCT Filed: Feb. 6, 1987

[86] PCT No.: PCT/GB87/00096
§ 371 Date: Nov. 27, 1987
§ 102(e) Date: Nov. 27, 1987

[87] PCT Pub. No.: WO87/04865
PCT Pub. Date: Aug. 13, 1987

[30] Foreign Application Priority Data

Feb. 6, 1986 [GB] United Kingdom ............... 8602913

[51] Int. Cl.$^5$ .................... H01Q 1/52; H01Q 7/00
[52] U.S. Cl. ........................... 343/742; 343/867; 340/572
[58] Field of Search ............... 343/741, 742, 866, 867; 340/572

[56] References Cited

U.S. PATENT DOCUMENTS

| 2,597,518 | 5/1952 | Parks | 343/867 |
| 2,779,908 | 1/1957 | Martin | 323/50 |
| 4,633,250 | 12/1986 | Anderson | 343/742 |

FOREIGN PATENT DOCUMENTS 474438  4/1929  Fed. Rep. of Germany ...... 343/867

Primary Examiner—Rolf Hille
Assistant Examiner—Michael C. Wimer
Attorney, Agent, or Firm—Rosenblum; Parish; Bacigalupi

[57] ABSTRACT

In an inductive communication system (11) in which transmit (16) and receive (18) aerials are in communication with a transponder (40), one of the aerials, e.g. the receive aerial (18), is arranged in two parts (61,62), one of the parts (61) being closely mutually-inductively coupled to the transmit aerial, and the other part being remote from the transmit aerial, so that the interference signal received by the receive aerial from the transmit aerial is substantially cancelled by the mutually inductive coupling. The two parts (61,62) are preferably parts of a single continuous conductor. Alternatively one of the parts may form a tapped coil with the other aerials. The aerials may be coaxial and/or coplanar.

8 Claims, 2 Drawing Sheets

AERIAL SYSTEMS

BACKGROUND OF THE INVENTION

The present invention relates to aerial systems and more particularly to aerial systems operating in the induction communication range and comprising at least one receive and transmit aerial pair. The aerial pair may be used in presence sensing or identification systems employing transponders or tags, such as those described in the following patents: G.B. Pat. Nos. 2017454B, 2077556 and 2102250.

A problem with receive/transmit aerial pairs, especially when the aerials of the pair are relatively closely positioned and operating at similar frequencies, is that mutual interference or interaction occurs.

One solution which has been proposed is to screen the receive aerial from the transmitted field. In certain instances, however, screening is not practical or is ineffective.

Another proposed solution to this problem is to arrange the transmitted aerial so that the electric and magnetic components of the transmitted field are orthogonal with respect to the respective components at the receive aerial. However, this solution cannot be applied where the effective axes of the transmit and receive aerials are constrained. This solution may also be inappropriate where a system comprises two aerial pairs. If two pairs are employed with the aerials within each pair being mutually orthogonal but with the pairs having a random orientation with respect to each other, the range of possible resultant combinations of orientations between the two pairs causes complex problems. In a transponder or tag communication system, for example, the deviation from the optimum value of the signal from the control equipment to the tag may permit activation of the tag without being able to detect its response. Such a system might comprise a small handheld transponder and control equipment with a fixed reading head comprising a receive and transmit aerial pair. The net effect of such a configuration is to reduce the average range performance of the system.

One particular solution is proposed in U.S. Pat. No. 2,779,908, in which the coupling between the transmitting and receiving coils of an inductive train identification system is reduced by a short-circuited neutralizing coil. However, certain limitations are still imposed on the physical relationship between the coils.

SUMMARY OF THE INVENTION

The present invention seeks to overcome or reduce one or more of the above-mentioned disadvantages.

According to the present invention there is provided an aerial array comprising transmit and receive aerial coil means, a signal transmitted by the transmit aerial coil means being received by the receive aerial coil means, and means for cancelling the effect of the transmitted signal, characterised in that one of the aerial coil means comprises a first part which is relatively close to and closely mutually inductively coupled with the other aerial coil means and a second part which is relatively remote from the other aerial coil means, said first part constituting said cancelling means, whereby the transmitted signal is substantially cancelled by a signal generated by the mutually inductive coupling between said first part and said other aerial means.

An advantage of the above array is that cancellation of the interference signal is achieved whilst still permitting sufficient interaction with a relatively distant transmit/receive system. A further advantage is that by enabling the planes of the receive and transmit aerials to be parallel, rotation of the aerial pair out of its optimal orientation would degrade the performance of the transmit and receive paths by an equal amount. Such an arrangement also permits a compact aerial pair to be provided, since the aerials do not need to be mutually inclined.

The aerials are preferably substantially coplanar and may also be substantially co-axial.

The interaction-cancelling means reduces the interference from the transmit aerial by the introduction into the receive aerial of a second signal which is similar in amplitude but opposite in phase to that which is introduced by the transmit aerial. The resultant interference is thus effectively reduced to a level which is no longer significant.

The aerial pair preferably constitutes part of an interrogator-transponder system and may be used as the transponder aerial pair and/or as the interrogator aerial pair.

In one preferred embodiment a transmitter loop aerial surrounds a coplanar receive aerial, the receive aerial comprising a loop arranged closely to the transmitter loop and a plurality of loops at a central region of the transmitter loop.

BRIEF DESCRIPTION OF THE DRAWING

Preferred embodiments of the present invention will now be described, by way of example only, with reference to the accompanying drawings, of which.

DESCRIPTION OF THE PREFERRED EMBODIMENTS

Figure 1:
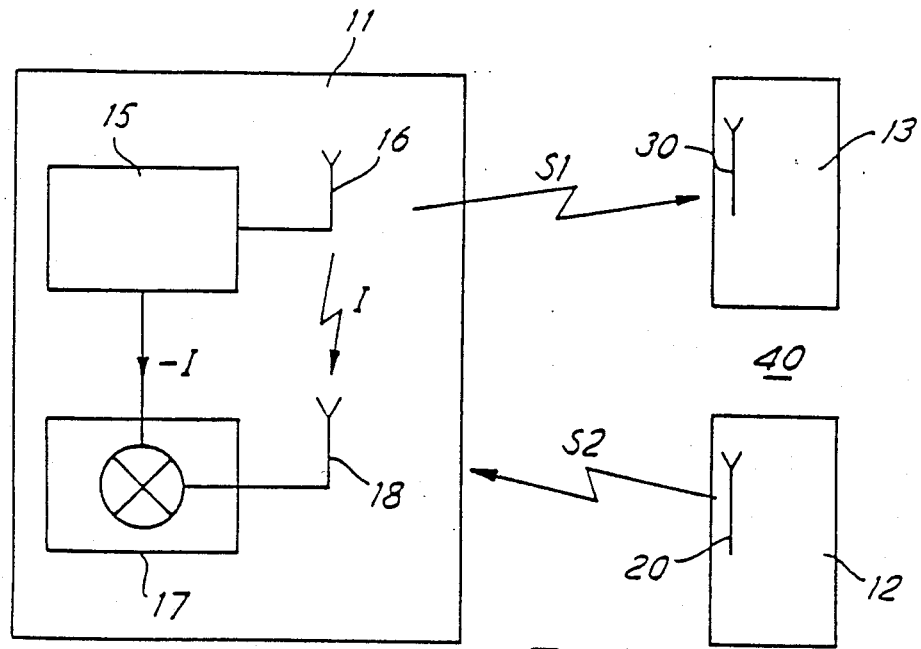
FIG. 1 is a schematic diagram of a communication system illustrating the general principle of the present invention.

Referring now to the drawings, FIG. 1 shows a system 11 exchanging information with a receiver 13 and a transmitter 12.

System 11 may be a controller communicating in the induction communication range up to 150kHz with a receiver 13 and transmitter 12 which are parts of a single transponder device 40. System 11 comprises transmit circuitry 15 connected to a transmit aerial 16 which transmits a signal S1 to the receive aerial 30 of receiver 13. System 11 also comprises receive circuitry 17 which receives a signal S2 from transmit aerial 20 of transmitter 12 via receive aerial 18.

In operation some of the transmitted signal S1 will be received as interference by the receive aerial of system 11. As the positions of the transmit and receive aerials of system 11 are fixed with respect to each other, the interference I will be in a known ratio to the transmitted signal S1. Means are provided to generate an opposite signal −I, which is added so as to have little effect upon S1 while removing the effect of the interference. As represented in FIG. 1, the signal −I is added to the resultant received signal S2+I.

Figure 2:
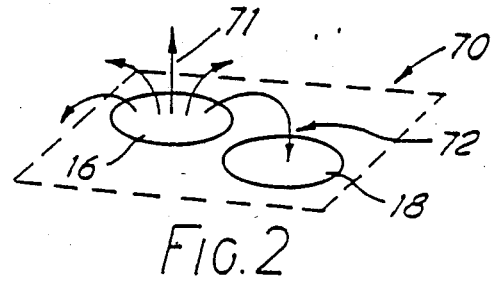
FIG. 2 shows a planar aerial pair in connection with which the arrangement of FIG. 1 may be employed.

FIG. 2 illustrates schematically a generally planar aerial pair 70. The magnetic field 71 transmitted by aerial loop 16, which comprises a plurality of turns, has a part 72 which constitutes unwanted interference with receive aerial loop 18. The interference may be reduced to a certain extent by increasing the separation of the aerials, but an advantage of the present invention is that the interference can be effectively nulled whilst still permitting sufficient interaction with a relatively distant transmit/receive system.

Figure 3:
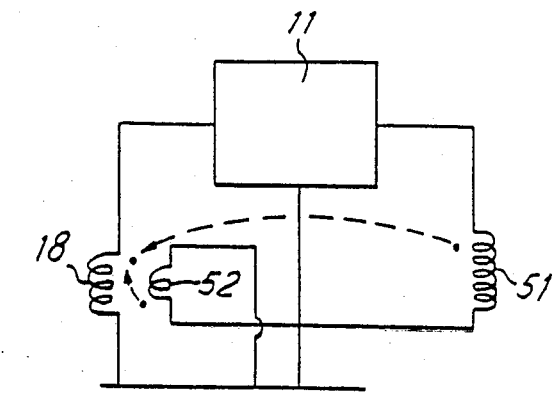
FIG. 3 shows a circuit arrangement corresponding to FIG. 1.

A preferred embodiment of the present invention is shown in FIG. 3. A small number of turns 52 are connected in series with the main transmit aerial 51 and closely coupled to the receive aerial 18 in opposing phase. The mutual coupling M between turns 52 and aerial 18 is high, whereas the mutual coupling between aerials 18 and 51 is low.

Figure 4:
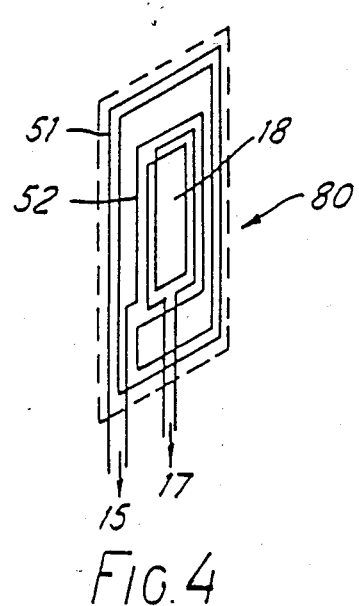
FIG. 4 shows a planar co-axial aerial pair in connection with which the arrangements of FIGS. 1 and 3 may be employed.

FIG. 4 illustrates schematically a generally coplanar aerial pair 80 comprising an arrangement in accordance with FIG. 3 with a transmit aerial comprising an outer loop 51 and an inner loop 52 surrounding a receive aerial loop 18. The arrangement in FIGS. 3 and 4 has a component of transmit field cancellation. However, it is advantageous to maximise the transmit field from aerial 16 to make full use of the size of the pair. One such advantageous arrangement will now be described.

Figure 5:
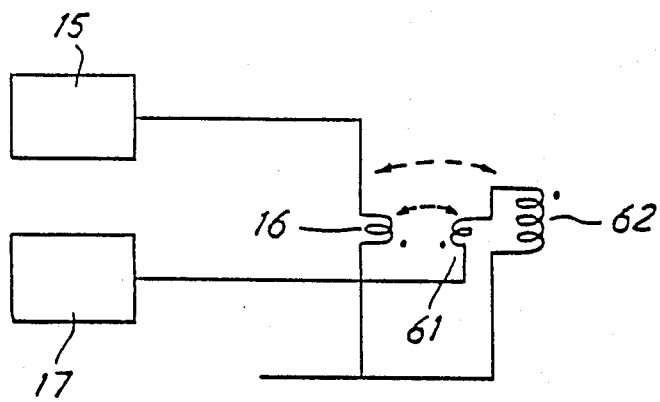
FIG. 5 shows a circuit arrangement which corresponds to FIG. 1 and can also be used with the aerial pair of FIG. 4.

The embodiment of FIG. 5 involves a component of receive field cancellation. A relatively small number of turns 61 are connected in series with the main receive aerial 62 and closely coupled to the transmit aerial 16. The mutual coupling M between turns 61 and aerial 16 is high, whereas the mutual coupling between aerials 62 and 16 is low.

Figure 6:
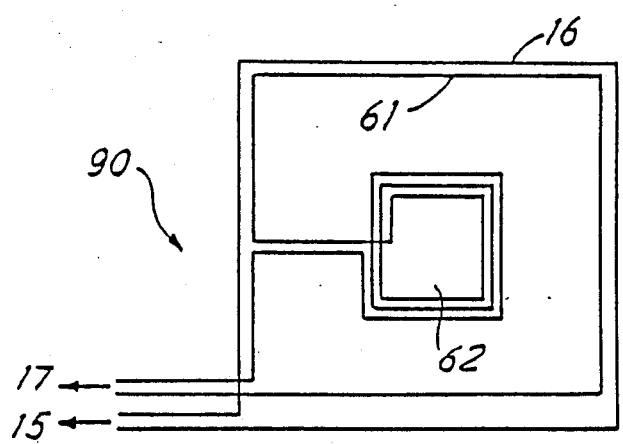
FIG. 6 shows a planar co-axial aerial pair arranged in accordance with FIG. 5.

FIG. 6 shows a preferred way of modifying the arrangement of FIG. 4 so as to be in accordance with the circuit of FIG. 5. An aerial pair 90 comprises an outer transmit aerial loop 16 and an inner receive aerial comprising a single outer loop 61 and inner loop 62 comprising a plurality n of turns. Here, in contrast to the arrangement of FIG. 2, the receive aerial is within the transmit aerial and the field distribution within the transmit loop is exploited. Loop 61 contains magnetic field of higher strength by virtue of being closer to the transmit aerial wire. It effectively nulls the interference coupled into loop 62; however the area of loop 62 multiplied by its number of turns n is greater than the area of loop 62 so that a nonnegligible residual coupling exists with a distant source field.

The term "loop" embraces loops with a single turn and loops with a plurality of terms, and the figures are only schematic. The important feature of FIGS. 4 and 6 is that the number of turns in loops 52 and 61 is less than the number of turns in loops 51 and 62 respectively.

In a preferred field of use, an aerial such as 80 or 90 is permanently fixed and connected to main control equipment of an interrogator-transponder system, such as those disclosed in the above-mentioned G.B. patents. The control equipment communicates with a portable transponder which may also have a planar aerial pair, and which may thus be a credit card sized and shaped transponder. When the transponder is brought within range of the fixed aerial it will be activated and send its response. The range of the system at any time is directly related to the position and the angle of rotation of the transponder with respect to the fixed aerial. As the transponder is rotated so the range of both the transmit and receive paths is affected equally. The transponder may transmit a coded or uncoded signal.

Figure 7:
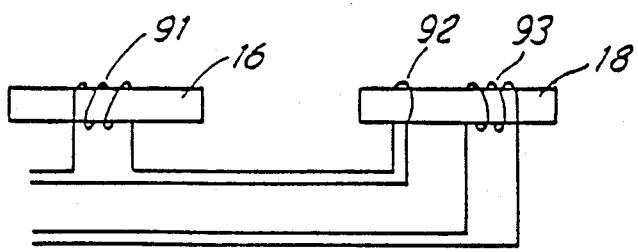
FIG. 7 shows a pair of ferrite aerials in connection with which the arrangement of FIG. 1 is employed.

It is generally the case that for greatest effectiveness, the aerials are of a similar shape to their enclosure. Thus where a compact flat transponder is required, the use of a planar aerial pair is highly advantageous.

Where a tubular enclosure is required elongate ferrite aerials are preferred. FIG. 7 schematically shows such an arrangement comprising an aerial pair (transponder) 95 comprising transmit and receive ferrite aerials 16, 18. The magnetic field transmitted by aerial 16 has a part which constitutes unwanted interference with the receive aerial 18. This interference is supressed by splitting the transmit coil into a main part 91 wound on the transmit ferrite aerial 16 and a subsidiary part 92 wound on the receive ferrite aerial 18. Receive coil 93 is also mounted on the receive ferrite aerial. Coil 92 is connected in series with coil 91 such that the field caused by coil 92 in ferrite aerial 18 effectively cancels there the field produced by coil 91 in ferrite aerial 16. In an alternative arrangement the subsidiary coil is in series with the receive coil 93 and is mounted on ferrite aerial 16 instead.

Various modifications may be made to the abovedescribed embodiments. For example the numbers of turns of any coil may be varied, and coils or loops placed inside other loops may be placed outside them, or combined as inside and outside, provided there remains an effective nulling by use of the transmit or receive interference, while maintaining an asymmetry of the nulling turns and main aerial turns such that communication with a relatively remote device or aerial can be effected.

Although as described receiver 13 and transmitter 12 are parts of a single device they may alternatively be parts of different devices.

Although in FIG. 3 coils 18 and 52 are separate, in a practical arrangement they may be constituted by a single tapped coil.

Although the invention is of particular advantage in low frequency applications, it may also be employed in high frequency systems.

In the examples above the interference reduction has been shown using only one additional nulling device. It is, however, also possible to derive benefit from more than one nulling device where an element of the interference signal is in quadrature to the transmitted signal due to the effect of the environment. This may be due to the effect of conductive or tuned bodies lying within the region affected. In higher frequency systems this may also be due to phase shifts resulting from speed of propogation of the signal.

What is claimed is:

1. An aerial array for a communication system including transmit means and receive means, said array comprising a transmit aerial coil connected to said transmit means and a receive aerial coil connected to said receive means, said aerial coils being fixed relative to each other, and being in mutual communication whereby a signal transmitted by the transmit aerial coil in use is received by the receive aerial coil, wherein said aerial coils constitute a first aerial coil and a second aerial coil, said first aerial coil having a first part and second part, said first part having at least one turn, and said second part having at least one different turn, said first part being relatively close to said second aerial coil to provide a mutual inductive coupling with said second aerial coil, said second part being relatively remote from said second aerial coil, whereby said first part constitutes signal cancelling means, and whereby said transmitted signal is substantially cancelled by a signal generated by said mutual inductive coupling between said first part and said second aerial coil.

2. An array according to claim 1, wherein said first and second parts are formed by a single continuous conductor.

3. An array according to claim 1, wherein the aerial coils each have a cross-sectional shape defining a substantially central axis, said axes being substantially coincident with each other.

4. An array according to claim 1, wherein the aerial coils are each flat and are located to be coplanar with each other.

5. An array according to claim 1, wherein the aerial coils each have a cross-sectional shape and are each flat, and are located to be coaxial and coplanar with each other.

6. An array according to claim 5 wherein said transmit aerial coil comprises a transmitter loop means, said transmitter loop means surrounding said receive aerial coil, and said receive aerial coil comprises first receive loop means and second receive loop means, said first receive loop means being arranged closely to said transmitter loop means, second receive loop means comprising more turns than said first receive loop means and said second receive loop means being located at a central region of said transmitter loop means.

7. A transponder communication arrangement including first and second communication systems, said first communication system constituting control equipment and said second communication system constituting a transponder device, said control equipment including a first aerial array and said transponder device comprising a second aerial array, said first and second aerial arrays being in communication with each other, wherein one of said aerial arrays includes transmit means and receive means and is comprised of a transmit aerial coil connected to said transmit means and a receive aerial coil connected to said receive means, said aerial coils being fixed relative to each other, and being in mutual communication whereby a signal transmitted by the transmit aerial coil in use is received by the received aerial coil, wherein said aerial coils constitutes a first aerial coil and a second aerial coil, said first aerial coil having a first part and second part, said first part having at least one turn, and said second part having at least one different turn, said first part being relatively close to said second aerial coil to provide a mutual inductive coupling with said second aerial coil, said second part being relatively remote from said second aerial coil, whereby said first part constitutes signal cancelling means, and whereby said transmitted signal is substantially cancelled by a signal generated by said mutual inductive coupling between said first part and said second aerial coil.

8. An arrangement according to claim 7 wherein said aerial arrays are of the inductive communication type.

* * * * *